(12) United States Patent
Patino et al.

(10) Patent No.: US 6,300,743 B1
(45) Date of Patent: Oct. 9, 2001

(54) SINGLE WIRE RADIO TO CHARGER COMMUNICATIONS METHOD

(75) Inventors: Joseph Patino, Pembroke Pines; Ronald Coapstick, Fort Lauderdale, both of FL (US); Vijaykumar D. Desai, Lawrenceville, GA (US)

(73) Assignee: Motorola, Inc., Schaumburg, IL (US)

( * ) Notice: Subject to any disclaimer, the term of this patent is extended or adjusted under 35 U.S.C. 154(b) by 0 days.

(21) Appl. No.: 09/521,151

(22) Filed: Mar. 8, 2000

(51) Int. Cl.$^7$ ........................................................ H02J 7/00
(52) U.S. Cl. ............................................. 320/106; 320/125
(58) Field of Search ..................................... 320/106, 129, 320/130, 145, 125, 138, 140

(56) References Cited

U.S. PATENT DOCUMENTS

| | | | |
|---|---|---|---|
| 5,895,440 | * 4/1999 | Proctor et al. ........................ | 320/138 |
| 5,905,358 | * 5/1999 | Fernandez et al. ................... | 320/125 |
| 6,031,353 | * 2/2000 | Banyas et al. ........................ | 320/112 |

* cited by examiner

*Primary Examiner*—Peter S. Wong
*Assistant Examiner*—Lawrence Luk
(74) *Attorney, Agent, or Firm*—Philip H. Burrus, IV

(57) ABSTRACT

This invention is a single wire interface communication system whereby a phone having internal charging circuitry communicates the charging status of the battery attached to the phone by varying the duty cycle of a pulse with a predetermined period across the single wire interface. In a preferred embodiment, the predetermined pulse of time T, where T is 1 second, is divided into N divisions, where N equals 10. A duty cycle high for time T/N and low for time 9T/N represents a first charging state; a duty cycle high for time 2T/N and low for time 8T/N corresponds to a second charging state; and so on. The system allows for information to be transmitted across a single wire, thereby freeing data connections for other accessories.

17 Claims, 2 Drawing Sheets

SINGLE WIRE RADIO TO CHARGER COMMUNICATIONS METHOD

TECHNICAL FIELD

This invention relates generally to chargers for communications devices. More specifically, this invention relates to a single wire communication method for transmission of charging status from a phone to a charger.

BACKGROUND

In the past, cellular phones have been used as communication devices that transmit analog acoustic signals, i.e. voice and sound, from a handset to a cellular network. When a person speaks into the phone, the sound waves generated by the mouth are received by a microphone and converted into analog electrical signals, or waves. These electrical waves are then transmitted from the phone to a cellular tower, where they pass through the cellular network and are then routed to the recipient's phone. The electrical waves are then converted back into sound through a loud speaker. In this fashion, analog phones provide effective, reliable transmission of sound.

The advent of digital phones brought about a change in the transmission process. In a digital phone, the sound waves received by the microphone are encoded into a specific series of zeroes and ones called a "digital word". This encoding takes place in an "analog to digital" converter. The zeroes and ones are then sent to the cellular network in the form of radio waves, where they again pass through the tower and are sent to the recipient's phone. There they are decoded by a "digital to analog" converter. They then are converted to sound through the loud speaker.

Digital phones offer several advantages over their analog counterparts. First, digital signals are virtually immune to static noise. Static takes the form of analog waves that look to the phone like normal phone calls. In a digital phone, however, the phone call looks very different from the static. The phone is thus able to filter out the noise.

Second, cellular networks can fit many more digital signals into a wire than analog signals. Again, due to the sophisticated filtering in digital systems, a phone can easily distinguish it's digital call from that intended for another phone.

Finally, as computers also communicate with ones and zeroes, digital phones are able to receive more than just sound. For example, digital phones can receive pages, caller identification data, internet information, text, pictures and other information. The i1000 phone manufactured by Motorola, for instance, can receive text pages, voice mail, and caller identification data in addition to phone calls!

While these additional features of digital phones are great for the end user, they present some major obstacles for the battery charger designer. For example, chargers for some phones include charging algorithms which ramp and taper the voltage and current to charge a battery. Chargers for other phones, however, supply basic voltage to the phone, while charging circuitry inside the phone ramps and tapers the voltage and current. For these phones, where the charging circuitry located inside the phone, the phone must communicate it's charging state, i.e. one quarter charged, half charged, etc., to the charger. This information is needed by the charger because the charger lights an indicator depending -upon the charge state. For example, a green light on the charger might indicate a fully charged battery while a red light might indicate a charging battery.

Traditionally, this communication occurred through a data connector located on the bottom of the phone. When the phone was in the charger, the charger data connector mated with the phone data connector. The state of charge was communicated digitally across this interface. With the advent of digital communication features, many phones now come with accessories like global positioning systems that connect to the phone's data connector. If such an accessory is connected to the phone when the phone is inserted in the charger, the charger can no longer use this port for communicating charging information.

There is thus a need for an improved, simplified charging status indication means in telephone/charger systems.

SUMMARY OF THE INVENTION

This invention is a method by which the charging status of a battery can be transmitted from a microprocessor in a phone or radio to a charger across a single wire interface. The communication is accomplished by modulating the duty cycle of logic "high" signals across a predetermined pulse period. The pulse period is subdivided into N increments. By way of an example, if N=10 and the pulse width is 1 millisecond, each 1/10 of a millisecond is one division. A word then corresponds to a specific relationship of the number of divisions that the line is high, versus the number of divisions the lines is low. In other words, when the logic signal on the one wire interface is high for one-tenth of a pulse, this may correspond to a battery state of 0% to 30% charged, which should cause a red LED on a charger to illuminate. In another case, if the line is high for two-tenths of a pulse, this may tell the charger that the battery is between 31% and 60% charged, causing the charger to light a yellow LED. This invention is for use in systems where the charger acts as a slave to a phone or radio that has its own charging circuitry.

DETAILED DESCRIPTION OF THE INVENTION

Many modern phones include internal battery charging circuitry. The phone includes charging circuitry in order to accept a wider variety of charging devices. For example, when a phone includes charging circuitry, either a power supply—which supplies a constant voltage and current—or a charger—which supplies a specific battery charging tapered, ramped, or modulated current—can be used to charge the battery. When a power supply is connected, the internal charging circuitry works to ramp, taper, or modulate the current to charger the battery. When a charger is connected, either the charging circuitry of the charger or the charging circuitry of the phone remains passive. The other circuit then ramps, tapers and modulates the current to charge the battery.

When a phone does not include charging circuitry, the only device that may be connected to the phone to charge the battery is a charger. As batteries are most efficiently charged with specific charging algorithms, if a power supply—with constant voltage and current—were connected, the phone would not charge the battery. This is true because if the voltage or current coming from the power supply were too great, reliability and performance of the battery could be compromised.

When engineers build a charger specifically for a phone with internal charging circuitry, they often eliminate the chargers charging circuitry to eliminate redundancy and reduce cost. In other words, as the engineer knows that the phone will be equipped with charging circuitry, he knows not to add such circuitry to the phone pocket of the charger. Thus, the engineer generally designs in a direct connection from the power supply to the phone pocket of the charger. This allows the phone to sit in a desk top charging stand while being connected directly to a power supply.

Figure 1:
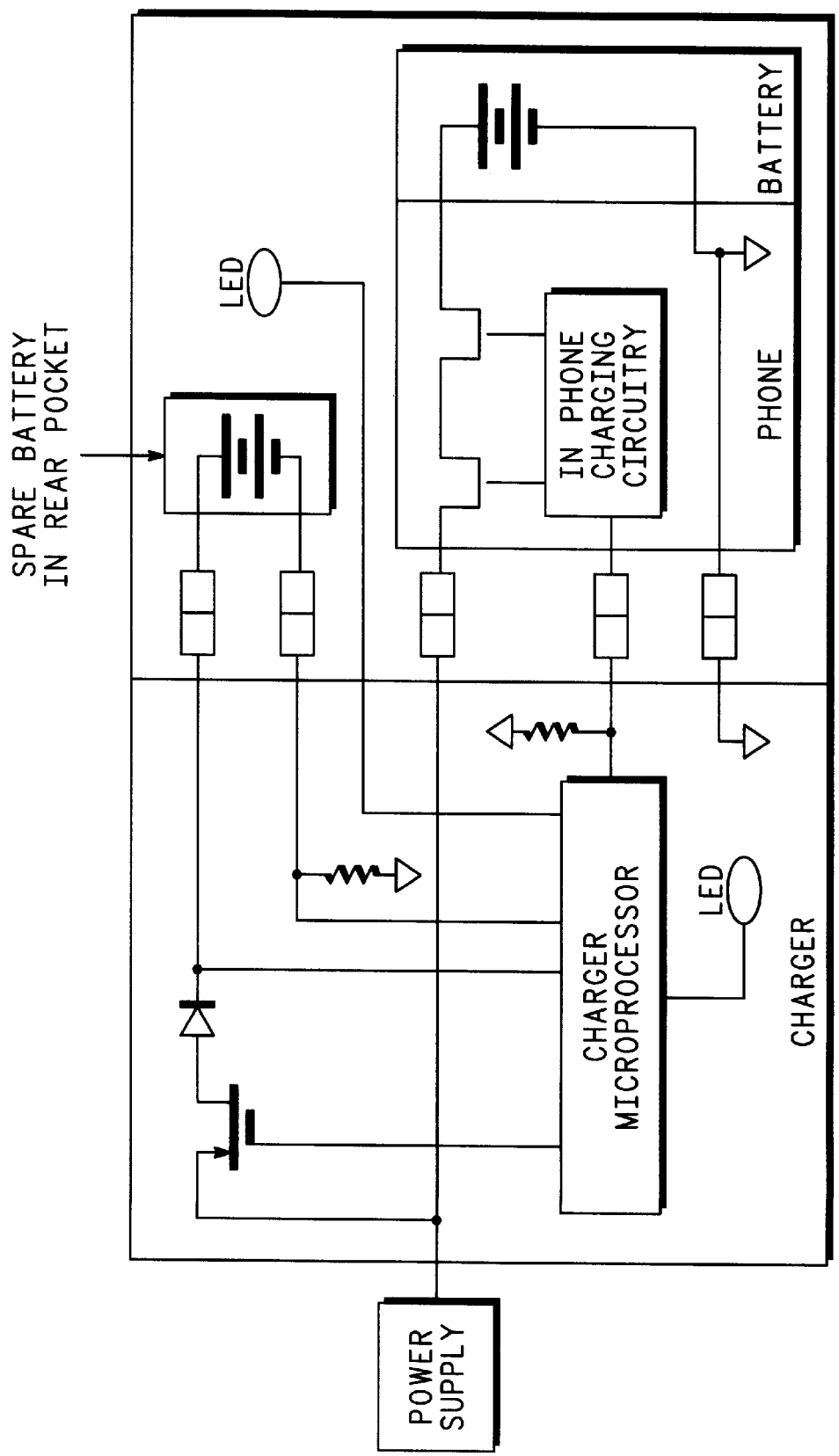
FIG. 1 illustrates a preferred embodiment of the hardware used to implement the invention.

Referring now to FIG. 1, a charging system 1 with a passive desk-top stand 100 is illustrated therein. In this system 1, a charger 100 with a microprocessor 101 is provided which includes two pockets 110,111 for charging batteries. The first pocket 110 is for charging a phone 200 with a battery 300 attached. The second pocket 111 is for charging a battery 400 by itself. The front pocket 110 provides a first set of contacts 114,106,107 for providing an electrical connection between the phone 200 and the charger 100. Similarly, a second set of contacts 108,109 are provided for connecting the an additional battery 400 to the charger 100.

The charger 100 is equipped with a microprocessor 101 which ramps, tapers, and modulates the voltage and current supplied by the power supply 10 for the second pocket 111. This is accomplished by driving a pass element 115 with a control line 114. Additionally, the microprocessor 101 drives a first indicator light emitting diode 112, "LED", through a first LED control line 113. This first LED 112 indicates the status of charge of the battery 301 in the front pocket 110. The microprocessor also drives a second LED 116, through a second LED control line 117. The second LED 116 indicates the state of charge for the spare battery 400 in the rear pocket 111.

In a preferred embodiment, the LEDs 112,116 emit different colors and patterns to indicate states of charge. For simplicity, we will use the first LED 112 and the battery 301 in the front pocket 110 to illustrate this function. The same function can be applied to the second LED 116 to indicate the state of charge of the spare battery 400 in the rear pocket.

When the battery 301 is between 0% and 30% charged, the LED 112 is driven to a solid red state. When the battery 301 is 31% to 60% charged, the LED 112 is driven yellow. When the battery 301 is 61% to 90% charged, the LED 112 is driven to a flashing green state. When the battery 301 is 91% to 100% charged, the LED 112 is driven to a solid green state. If the battery 301 is too hot or to cold, and thus the charger 100 is in stand-by mode while waiting for the battery 301 to cool, the LED 112 is driven to a flashing yellow state. If there is an error in charging, the LED 112 is driven to a flashing red state. If no battery is in the front pocket 110, the LED 112 is turned off.

In the front pocket 110, charging is controlled by the charging circuitry 201 in the phone 200, as a direct connection 105 from the power supply 10 is provided to the first set of contacts 107,114. The charging circuitry 201 in the phone 200 ramps, tapers and modulates the voltage and current being delivered to the battery 300 attached to the phone 200. While the charger 100 is passive, the LED 112 still needs to indicate the state of charge for the battery 300 attached to the phone 200.

The invention is a single wire interface 102 by which the charging circuitry 201 in the phone 200 communicates the battery 300 state of charge to the microprocessor 101 in the charger 100. Once the microprocessor 101 in the charger 100 receives this information, it 101 can then illuminate the LED 116 correspondingly. The means by which the invention is implemented include a single wire bus 102 which connects the charging circuitry 201 in the phone 200 to the charger microprocessor 101. In the charger 100, this line 102 is pulled up to +5V 104 by a pull-up resistor 103. The single wire connection 102 between the phone 200 and charger 100 is made through a single wire contact 106 located in the front pocket 110.

In accordance with the invention, the microprocessor 101 in the charger 100 looks for data across the single wire interface 102 in N divisions across a period T. By way of an example, we will assume that N=10 and T=1 second. Note that a corresponding period of N is T/N, or 100 milliseconds. When no phone is in the front pocket 110, the pull-up resistor 103 keeps the single wire interface 102 constantly high (pulled up to +5V 104). The microprocessor 101 in the charger 100 thus sees the interface 102 at +5V 104 for the entire 1 second pulse and thereby knows that no phone is in the front pocket 110. The LED 112 is correspondingly driven to an off state.

Once a phone 200 is placed in the front pocket 110, however, the charging circuitry 201 in the phone 200 has the ability to drive the single wire interface 102 to a low state. When the single wire 102 transitions from a high to a low state, the microprocessor 101 in the charger 100 knows that a phone 200 has been placed in the pocket 110. The microprocessor 101 in the charger 100 then polls the single wire interface 102 once every 100 milliseconds, in wait for data to be transmitted.

The charging circuitry 201 in the phone 200 can then communicate the charging status of the battery 300 to the charger 100 by varying the duty cycle in multiples of N divisions across each 100 millisecond pulse. For example, if the pulse was high for a period of 1N, or 100 milliseconds, and low for 9N, or 900 milliseconds, this may correspond to a first charging state. Similarly a high state of 2N with a low state of 8N would correspond to a second charging state and so on.

Figure 2:
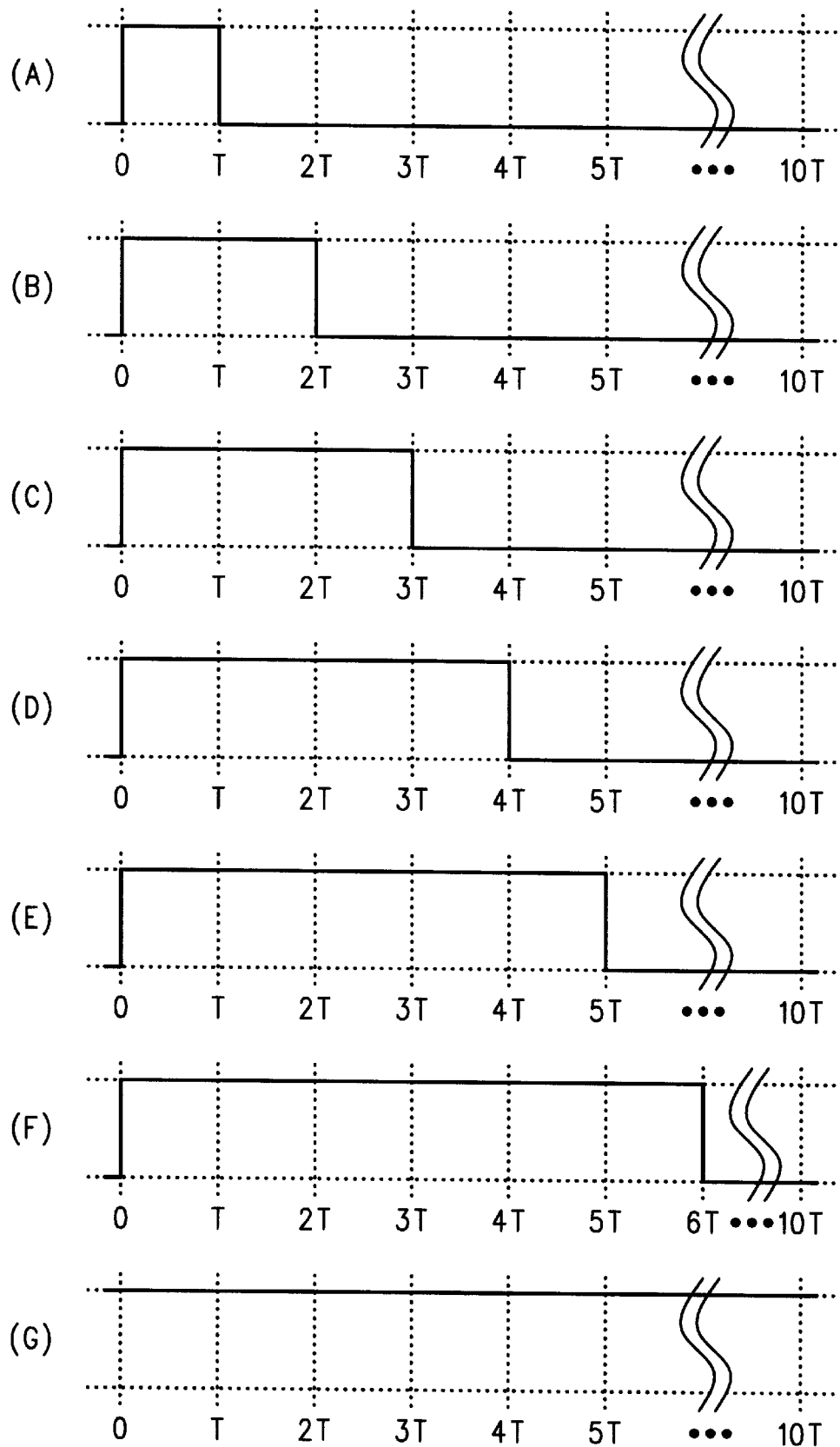
FIGS. 2A, 2B, 2C, 2D, 2E, 2F, 2G are illustrates a preferred embodiment of the duty cycle waveforms used for communication.

Referring now to FIG. 2, illustrated therein are several varying duty cycles based upon a pulse with period 10N. The pulse that is constantly in a low state is not shown, as this pulse transmits no charging information. As both the charger microprocessor and battery charging circuitry in the phone include real time clocks, they are able to discern the varying duty cycles transmitted across the single wire interface without needing additional clocking data.

The communication algorithm may best be explained by an example. In the lab, a charger and phone were built so as to recognize the following pulse duty cycles: First, a pulse where the single wire interface is high for a period 10N, illustrated in FIG. 2(G) indicates that there is no phone in the pocket and that the LED should be in the off state. A pulse that is high for a time N and then low for a time 9N, illustrated in FIG. 2(A), indicates a battery that is between 0% and 30% charged, which should cause the LED to be in a constant red state. A pulse that is high for a time 2N and then low for a time 8N, illustrated in FIG. 2(B), indicates a battery that is between 31% and 60% charged, which should cause the LED to be in a constant yellow state. A pulse that is high for a time 3N and then low for a time 7N, illustrated in FIG. 2(C), indicates a battery that is between 61% and 90% charged, which should cause the LED to be in a flashing green state. A pulse that is high for a time 4N and then low for a time 6N, illustrated in FIG. 2(D), indicates a battery that is between 91% and 100% charged, which should cause the LED to be in a constant green state. A pulse that is high for a time 5N and then low for a time 5N, illustrated in FIG. 2(E), indicates a battery that is too hot or too cold, which should cause the LED to be in a flashing yellow state. A pulse that is high for a time 6N and then low for a time 4N, illustrated by FIG. 2(F), indicates an error, which should cause the LED to be in a constant red state. A pulse that is high for more than 7N divisions indicates that no battery is present. In this fashion, the battery may communicate seven different states of charge across a single wire by varying the duty cycle of a pulse with period T and N divisions.

While the preferred embodiments of the invention have been illustrated and described, it is clear that the invention is not so limited. Numerous modifications, changes, variations, substitutions, and equivalents will occur to those skilled in the art without departing from the spirit and scope of the present invention as defined by the following claims. For example, while the invention has been described as a pulse with period T with 10 divisions, more information could be added by dividing the pulse into a larger number of divisions. A pulse with period T and 200 divisions, for instance, could communicate 16 different charging states if so desired.

What is claimed is:

1. A method of communicating battery charging status from a phone to a charger, the method comprising the steps of:
   A. providing a power supply which can be coupled to a charger for supplying voltage and current;
   B. providing a charger having
      i. a microprocessor;
      ii. at least one pocket for receiving a phone with a battery attached;
      iii. a first set of contacts for supplying a voltage and current;
      iv. a single wire interface coupled to the microprocessor;
      v. a charger contact coupled to the single wire interface;
      vi. a pull-up resistor coupled between the single wire interface and a positive voltage;
      vii. an identification display means capable of being driven into different states by the microprocessor;
   C. providing a phone having
      i. charging circuitry disposed therein;
      ii. a battery;
      iii. electrical contacts coupled to the charging circuitry for receiving voltage and current; and
      iv. a phone contact for the single wire interface coupled to the charging circuitry;
   D. wherein the charging circuitry communicates battery charging status to the microprocessor by varying the duty cycle of a pulse with a predetermined period across the single wire interface.

2. The method of claim 1, further wherein the predetermined period is divisible by ten.

3. The method of claim 2, further wherein when the pulse is high for one-tenth of the period and low for nine-tenths of the period, a first charging state is represented, causing the microprocessor to drive the identification display means into a first state.

4. The method of claim 3, further wherein when the pulse is high for two-tenths of the period and low for eight-tenths of the period, a second charging state is represented, causing the microprocessor to drive the identification display means into a second state.

5. The method of claim 4, further wherein when the pulse is high for three-tenths of the period and low for seven-tenths of the period, a third charging state is represented causing the microprocessor to drive the identification display means into a third state.

6. The method of claim 5, further wherein when the pulse is high for four-tenths of the period and low for six-tenths of the period, a fourth charging state is represented causing the microprocessor to drive the identification display means into a fourth state.

7. The method of claim 6, further wherein when the pulse is high for five-tenths of the period and low for five-tenths of the period, a fifth charging state is represented causing the microprocessor to drive the identification display means into a fifth state.

8. The method of claim 7, further wherein when the pulse is high for six-tenths of the period and low for four-tenths of the period, a sixth charging state is represented causing the microprocessor to drive the identification display means into a sixth state.

9. The method of claim 8, further wherein when the pulse is high for seven or more tenths of the period, a seventh charging state is represented causing the microprocessor to drive the identification display means into a seventh state.

10. The method of claim 9, wherein the identification display means is a light emitting diode.

11. The method of claim 10 wherein the first state of the identification display means is the light emitting diode illuminated solid red.

12. The method of claim 11 wherein the second state of the identification display means is the light emitting diode illuminated solid yellow.

13. The method of claim 12 wherein the third state of the identification display means is the light emitting diode illuminated flashing green.

14. The method of claim 13 wherein the fourth state of the identification display means is the light emitting diode illuminated solid green.

15. The method of claim 14 wherein the fifth state of the identification display means is the light emitting diode illuminated flashing yellow.

16. The method of claim 15 wherein the sixth state of the identification display means is the light emitting diode illuminated flashing red.

17. The method of claim 16 wherein the seventh state of the identification display means is the light emitting diode turned off.

* * * * *